US012751590B2

(12) United States Patent
Chen et al.

(10) Patent No.: US 12,751,590 B2
(45) Date of Patent: Oct. 6, 2026

(54) CLEANING SYSTEM AND CLEANING METHOD

(71) Applicant: PIXART IMAGING INC., Hsin-Chu (TW)

(72) Inventors: Shih-Feng Chen, Hsin-Chu (TW); Han-Lin Chiang, Hsin-Chu (TW); Ning Shyu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 60 days.

(21) Appl. No.: 18/914,380

(22) Filed: Oct. 14, 2024

(65) Prior Publication Data

US 2025/0031929 A1 Jan. 30, 2025

Related U.S. Application Data

(62) Division of application No. 17/900,949, filed on Sep. 1, 2022, now Pat. No. 12,156,632.

(51) Int. Cl.
*A47L 9/28* (2006.01)
*A47L 5/22* (2006.01)
(Continued)

(52) U.S. Cl.
CPC ............... *A47L 9/2815* (2013.01); *A47L 5/22* (2013.01); *A47L 9/009* (2013.01); *A47L 9/1409* (2013.01);
(Continued)

(58) Field of Classification Search
None
See application file for complete search history.

(56) References Cited

U.S. PATENT DOCUMENTS

2007/0097372 A1* 5/2007 Itagaki ............... G01N 15/1459 356/437
2019/0239709 A1* 8/2019 Thomas ............... B25J 11/0085
2022/0167813 A1 6/2022 Thakkar

FOREIGN PATENT DOCUMENTS

CN 109303521 A 2/2019
CN 112515536 A 3/2021
(Continued)

OTHER PUBLICATIONS

English Machine Translation of DE-202021001755-U1.*

*Primary Examiner* — Kaj K Olsen
*Assistant Examiner* — Pradhuman Parihar
(74) *Attorney, Agent, or Firm* — Li & Cai Intellectual Property (USA) Office

(57) ABSTRACT

A cleaning system and a cleaning method are provided. The cleaning system includes a main body, an air suctioning device, a light source, an optical sensor, a memory and a processing unit. The air suctioning device includes an air flow passage and a fan-motor assembly that is disposed in the air flow passage and generates a suction force to suction outside air through the air flow passage. The light source emit light to the air flow passage. The optical sensor captures a plurality of successive image frames from the air flow passage. The processing unit is configured to: obtain first and second image frames from the successive image frames; compare the first image frame with the second image frame to identify dust particles; obtain a particle feature of the dust particles; and determine a current cleanness condition according to the particle feature.

6 Claims, 8 Drawing Sheets

(51) Int. Cl.

| | |
|---|---|
| ***A47L 9/00*** | (2006.01) |
| ***A47L 9/14*** | (2006.01) |
| ***A47L 9/19*** | (2006.01) |
| ***A47L 9/22*** | (2006.01) |
| ***A47L 9/30*** | (2006.01) |
| ***G01N 15/075*** | (2024.01) |
| ***G05D 1/00*** | (2024.01) |
| ***G05D 1/65*** | (2024.01) |
| ***G06T 7/00*** | (2017.01) |
| ***G06V 10/75*** | (2022.01) |

(52) U.S. Cl.

CPC .................. *A47L 9/19* (2013.01); *A47L 9/22* (2013.01); *A47L 9/2821* (2013.01); *A47L 9/2852* (2013.01); *A47L 9/2894* (2013.01); *A47L 9/30* (2013.01); *G05D 1/0223* (2013.01); *G05D 1/65* (2024.01); *G06T 7/0002* (2013.01); *G06V 10/751* (2022.01); *A47L 2201/04* (2013.01); *G01N 15/075* (2024.01)

(56) References Cited

FOREIGN PATENT DOCUMENTS

| | | | | | |
|---|---|---|---|---|---|
| DE | 102018107027 | A1 | | 9/2019 | |
| DE | 202021001755 | U1 | * | 6/2021 | ............... A47L 5/24 |

* cited by examiner

CLEANING SYSTEM AND CLEANING METHOD

CROSS-REFERENCE TO RELATED PATENT APPLICATION

This application is a divisional application of U.S. application Ser. No. 17/900,949, filed Sep. 1, 2022, entitled "CLEANING SYSTEM AND CLEANING METHOD". The entire content of the above identified application is incorporated herein by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and a method, and more particularly to a cleaning system and a cleaning method.

BACKGROUND OF THE DISCLOSURE

Cleaning robots are known as independently moving and navigating robot units in the form of vacuuming robots, sweeping robots and mopping robots.

For the existing vacuuming cleaner robots, dust status can be detected for direct suction adjustment, however, there is no relevant confirmation and reporting mechanism for a user, and thus cleaning strategy cannot be adjusted accordingly.

If a suction force of the vacuuming cleaner robot is affected, a rotation speed of a motor is currently used to determine whether obstacles block air inlet and outlet. However, it is difficult to accurately determine whether or not a filter associated with a suction mechanism needs to be checked since a cleanness of the filter merely causes a small variation in the suction force.

SUMMARY OF THE DISCLOSURE

In response to the above-referenced technical inadequacies, the present disclosure provides a cleaning system and a cleaning method capable of identifying a cleanness condition according to image frames containing dust particles and adjusting a cleaning strategy according to the cleanness condition.

In one aspect, the present disclosure provides a cleaning system that includes a main body, an air suctioning device, a light source, an optical sensor, a memory and a processing unit. The air suctioning device is disposed in the main body, and the air suctioning device includes an air flow passage and a fan-motor assembly that is disposed in the air flow passage and configured to generate a suction force to suction outside air through the air flow passage. The light source is configured to emit light to the air flow passage. The optical sensor is configured to capture a plurality of successive image frames from the air flow passage. The processing unit is electrically connected to the optical sensor and the memory, and configured to: obtain a first image frame and a second image frame from the plurality of successive image frames; compare the first image frame with the second image frame to identify a plurality of dust particles; obtain at least one particle feature of the plurality of dust particles; and determine a current cleanness condition according to at least one particle feature.

In another aspect, the present disclosure provides a cleaning method, which includes: configuring a fan-motor assembly of an air suctioning device to generate a suction force to suction outside air through an air flow passage, in which the air suctioning device is disposed in a main body, and the fan-motor assembly is disposed in the air flow passage; configuring a light source to emit light to the air flow passage; configuring an optical sensor to capture a plurality of successive image frames from the air flow passage; configuring a processing unit electrically connected to the optical sensor and a memory to: obtain a first image frame and a second image frame from the plurality of successive image frames; compare the first image frame with the second image frame to identify a plurality of dust particles; obtain at least one particle feature of the plurality of dust particles; and determine a current cleanness condition according to at least one particle feature.

Therefore, in the cleaning system and the cleaning method provided by the present disclosure, particle features and corresponding cleanness condition can be obtained during a cleanness process by identifying dust particles from successive image frames, such that a cleanness strategy can be adjusted accordingly.

Furthermore, in the cleaning system and the cleaning method provided by the present disclosure, in response to dust enters a dust container through an air flow passage, particle size, passing speed and relevant information can be calculated by executing image processing algorithm, so as to determine whether or not a filter needs to be replaced due to excessive dust attachment. In addition, after cleaning processes are performed in a target region, a cleanness map can be created to provide cleanness information for the user to view.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
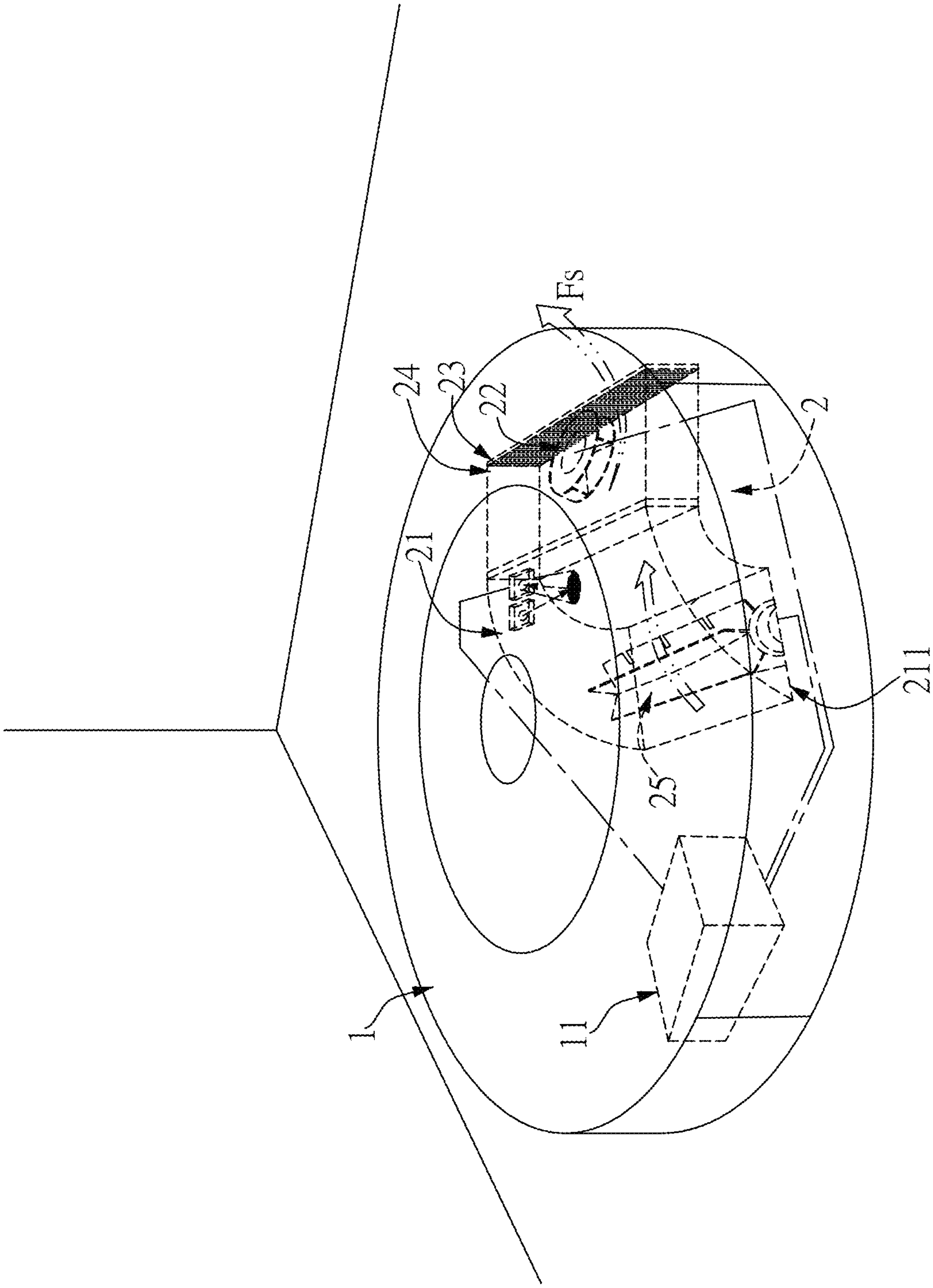
FIG. 1 is a schematic view of an autonomous robot that includes a cleaning system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
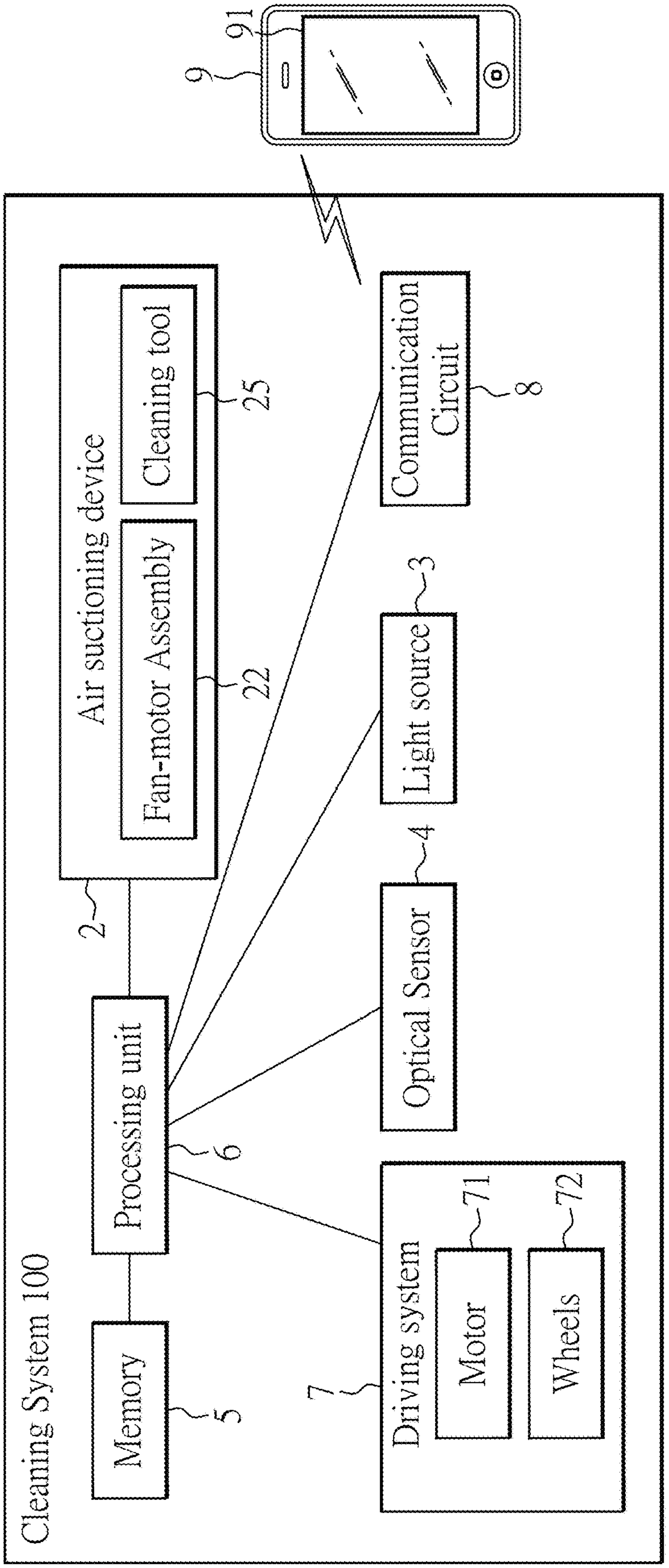
FIG. 2 is a block diagram of the cleaning system according to one embodiment of the present disclosure.

FIG. 1 is a schematic view of an autonomous robot that includes a cleaning system according to one embodiment of the present disclosure, and FIG. 2 is a block diagram of the cleaning system according to one embodiment of the present disclosure. Referring to FIGS. 1 and 2, one embodiment of the present disclosure provides a cleaning system 100 that includes a main body 1, an air suctioning device 2, a light source 3, an optical sensor 4, a memory 5 and a processing unit 6.

As shown in FIG. 1, an autonomous robot has the main body is shown. The air suctioning device 2 is disposed in the main body 1, and the air suctioning device 2 includes an air flow passage 21 and a fan-motor assembly 22 that is disposed in the air flow passage 21 and configured to generate a suction force Fs to suction outside air through the air flow passage 21.

More specifically, the fan-motor assembly 22 can generate a suctioning force to suction outside air through a suctioning hole 211 formed on the bottom of the main body 1. The air suctioning device 2 further includes a filter 23 and a dust container 24, and a cleaning tool 25. The cleaning tool 25 can be a brush with a rotation mechanism and disposed at the suctioning hole 211, and the filter 23 is disposed in the air flow passage 21 for separating dust included in air that flows by an operation of the air suctioning device 2. The dust container 24 is disposed to be in communication with the air flow passage 21, and functions to store the dust separated by the filter 23. However, the configuration of the fan-motor assembly 22, the filter 23 and the dust container 24 shown in FIG. 1 is merely an example, and is not meant to limit the scope of the present disclosure.

As shown in FIGS. 1 and 2, the light source 3 can be disposed in the air flow passage 21, and used to emit light L to the air flow passage 21, for example, to emit the light L on an inner surface of the air flow passage 21, but the present disclosure is not limited thereto. The light source 3 can also be disposed at another space where the light L can be emitted to the air flow passage 21. The light source 3 can include one or more light emitting devices, such as light bulbs or light emitting diode.

Further, the optical sensor 4 can be disposed in the air flow passage 21, and can be used to receive the lights reflected by dust flowed through the air flow passage 21. Similarly, the optical sensor 4 can be disposed at any location where the reflected light can be received therefrom. The optical sensor 4 can be, for example, an image sensor (e.g., CMOS or CCD sensor chip) that includes a plurality of image sensor units, such as photodiodes. The optical sensor 4 can be further configured to transform light signals into electrical signals.

The processing unit 6 is electrically connected to the light source 3, the optical sensor 4, and the memory 5. The processing unit 6 can be, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The processing unit 6 can execute program codes, software modules, instructions, and the like that are recorded in the memory 5 to implement the cleaning method according to one embodiment of the present disclosure.

The memory 5 can be configured to store images, program codes, software modules, and other data. It can be, for example, any type of fixed or removable random-access memory (RAM), read-only memory (ROM), flash memory, hard disks or other similar devices, integrated circuits and combinations thereof.

In the present embodiment, the cleaning system 100 further includes a driving system 7 disposed in the main body 1 and electrically connected to the processing unit 6. The driving system 7 includes a plurality of wheels 72 and a motor 71 configured to drive the plurality of wheels 72 to move or rotate the main body 1 (the autonomous robot). It should be noted that the processing unit 6 can be configured to control the components mentioned above. More specifically, the processing unit 6 can be used to control the light source 3 to be turned on and off, control the optical sensor 4 to capture an image and send the captured image to the processing unit 6, and control the motor 71 and the wheels 72 (through drive shafts, if needed) to drive the main body 1 to rotate or move according to instructions.

Moreover, the cleaning system 100 further includes a communication circuit 8 disposed in the main body 1. The communication circuit 8 can be configured to communicatively connected (e.g., wirelessly connected) to a mobile device 9 of a user. Therefore, information associated with a cleanness condition and a cleaning strategy is transmitted between the processing unit 6 and the mobile device 9 through the communication circuit 8. In certain embodiments, the communication circuit 8 can be a small-range or long-rang wireless communication circuit, which supports certain wireless communication protocols, such as 3G, 4G, 5G networks, BLUETOOTH, WIFI, and the like. Noted that the processing unit 6, the communication circuit 8.

The mobile device 9 can be, for example, a computer, a notebook, or a smart phone. For certain usage scenarios, a cleaner management application can be installed in the mobile device 9 and be executed to provide a user interface for the user to control the cleaning system 100, including functions such as power on/off, setting a cleaning strategy that defines a cleaning frequency and/or a cleaning route in a target region, and map establishing program that controls the autonomous robot to move and search walls, so as to establish a map for the target region.

Figure 3:
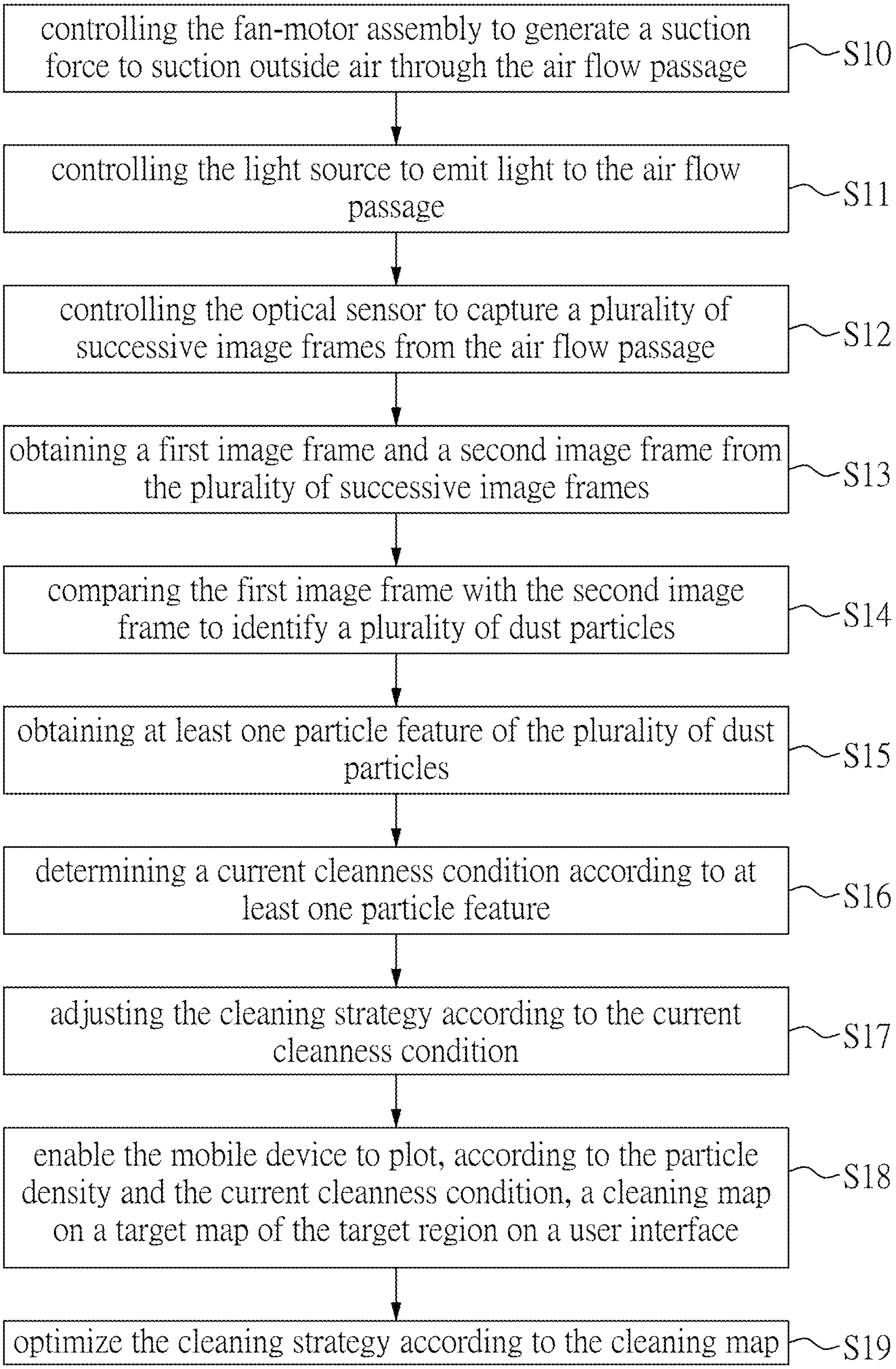
FIG. 3 is a flowchart of the cleaning method according to one embodiment of the present disclosure.

Reference can be further made to FIG. 3, which is a flowchart of the cleaning method according to one embodiment of the present disclosure. According to one concept of the present disclosure, the cleaning system and the cleaning method in the present embodiment are capable of identifying a cleanness condition according to image frames containing dust particles and adjusting a cleaning strategy according to the cleanness condition.

As shown in FIG. 3, the processing unit 6 can be configured to perform the following steps:

Step S10: controlling the fan-motor assembly to generate a suction force to suction outside air through the air flow passage. Noted that the processing unit 6 can simultaneously control the driving system 7 to drive the autonomous robot to move in the target region.

Step S11: controlling the light source to emit light to the air flow passage.

Step S12: controlling the optical sensor to capture a plurality of successive image frames from the air flow passage.

Step S13: obtaining a first image frame and a second image frame from the plurality of successive image frames.

Specifically, before the dusts enter the dust container 24, a size, a density of particles in the inhalation air passing through the air flow passage 21 should be recorded through image sensing, so as to obtain an indicator for quantifying an environment (i.e., floor) condition of a region where the autonomous robot is cleaning. Therefore, multiple successive image frames are captured from the inside of the air flow passage 21 by the optical sensor 4 with a predetermined sample rate, and two successive image frames can be selected from the multiple successive image frames to serve as the first and second image frames. However, the present disclosure is not limited thereto. In certain embodiments, the first and second image frames are not limited to be two successive image frames if a timing difference therebetween is known, in which the timing difference is defined as a time duration between time points that the first and second image frames are captured. Noted that in a case that a similarity between the first and second image frames is too low to find identical particles, the sample rate should be adjusted or the timing difference should be shortened.

Step S14: comparing the first image frame with the second image frame to identify a plurality of dust particles.

Figure 4A:
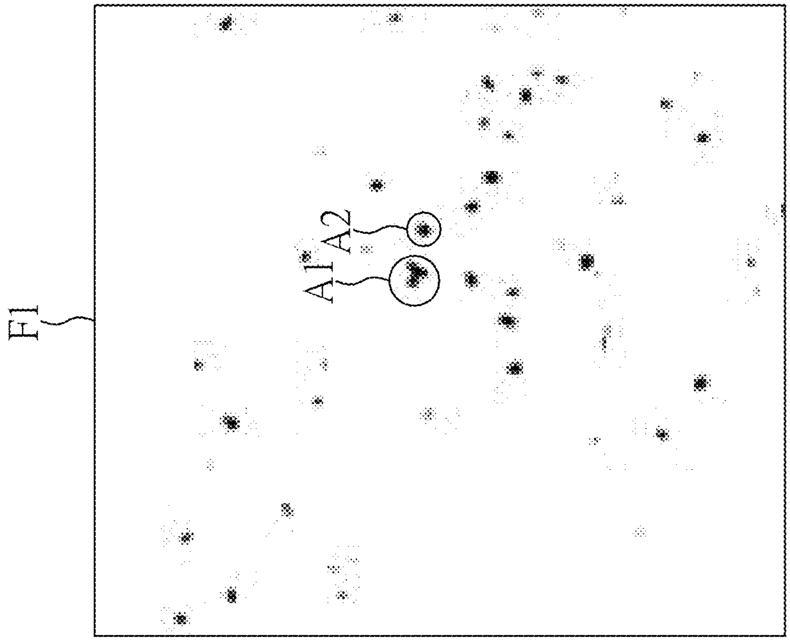
FIGS. 4A and 4B show first and second image frames captured according to one embodiment of the present disclosure.
Figure 4B:
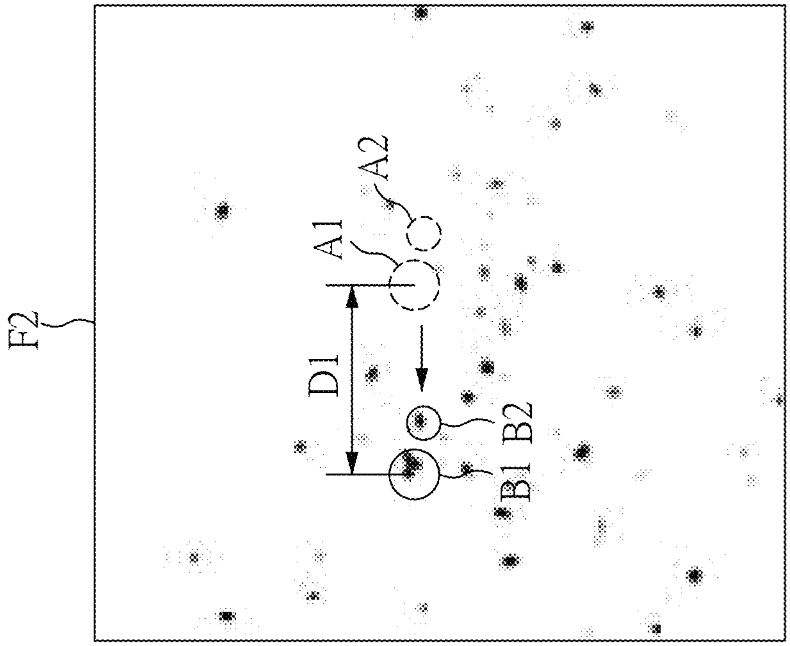

Reference can be made to FIGS. 4A and 4B, which show first and second image frames captured according to one embodiment of the present disclosure. As shown, the first image frame IMG1 and the second image frame IMG2 are selected, and can be subtracted to obtain a difference frame to frame, so as to find a displacement of large and small dust driven by the suction force Fs.

For example, the first image frame F1 is processed by the processing unit 6 and two particles A1 and A2 are identified. Next, the second image frame F2 is also processed by the processing unit 6 and two particles B1 and B2 are identified and determined to correspond to the particles A1 and A2 according to a particle feature such as a size or a shape. Noted that shadow changes between the first image frame F1 and the second image frame F2 can also be calculated to assist in identifying specific dust particles.

Step S15: obtaining at least one particle feature of the plurality of dust particles. Specifically, the at least one particle feature includes a particle size, a particle quantity, a particle density, a particle type, and/or a particle speed.

For example, a displacement D1 can be further calculated according to locations of the particles A1, A2, B1 and B2, and a particle speed can be calculated according to the displacement D1 and the sample rate or the timing difference mentioned above. It should be noted that, in order to accurately obtain the particle speed, the sample rate can be increased to be higher than a predetermined sample rate.

Furthermore, quantities, distances and/or areas of the identified particles of the first image frame F1 and the second image frame F2 are further recorded, which can then be used to calculate particle densities according to frame areas of the first image frame F1 and the second image frame F2.

Step S16: determining a current cleanness condition according to at least one particle feature. In this step, the particle densities calculated in the previous step can be used to determine the current cleanness condition. For example, a cleanness level can be used to define the current cleanness condition, and the cleanness level increases as the particle density decreases, and the present disclosure is not limited thereto.

Step S17: adjusting the cleaning strategy according to the current cleanness condition. For example, the processing unit 6 can be configured to automatically determine whether or not to repeat the cleaning route or to adjust a moving speed of the main body according to the particle quantity and the particle density. In another embodiment, the cleanness condition can be provided to the user through the user interface of the mobile device 9, such that the user can determine whether or not to adjust the cleaning strategy manually.

Step S18: enabling the mobile device to plot, according to the particle density and the current cleanness condition, a cleaning map on a target map of the target region on a user interface.

Figure 5:
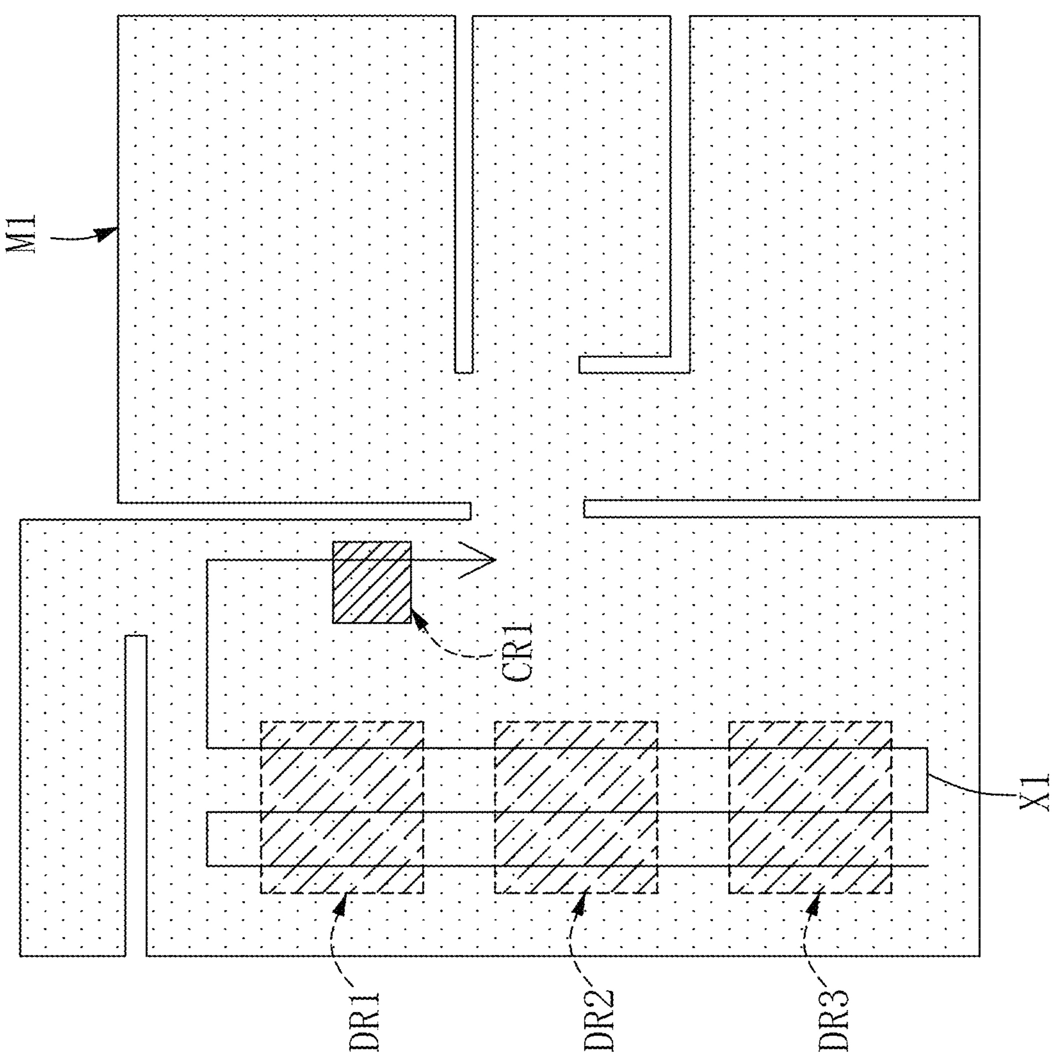
FIG. 5 is a schematic view showing a target map of the target region according to one embodiment of the present disclosure.

Reference is made to FIG. 5, which is a schematic view showing a target map of the target region according to one embodiment of the present disclosure. As shown in FIG. 5, after the current cleanness condition of the target map M1 is obtained, dirty regions DR1, DR2 and DR3 and a clean region CR1 can be plot on the target map M1 to establish the cleaning map. Specifically, the cleaning map can be display in a user interface on a display 91 of the mobile device 9.

Step S19: optimize the cleaning strategy according to the cleaning map.

For example, the cleaning strategy can be optimized to provide a new cleaning route X1 in the target map M1. Further, the optimized cleaning route X1 is planned to move back and forth to pass through the dirty regions DR1, DR2 and DR3 for multiple times, and only move once though the clean region CR1. In addition, cleaning rate can also be optimized according to the cleaning map.

Therefore, in the cleaning system 100 and the cleaning method provided by the present disclosure, particle features and corresponding cleanness condition can be obtained during a cleanness process by identifying dust particles from successive image frames, such that a cleanness strategy can be adjusted accordingly.

Figure 6:
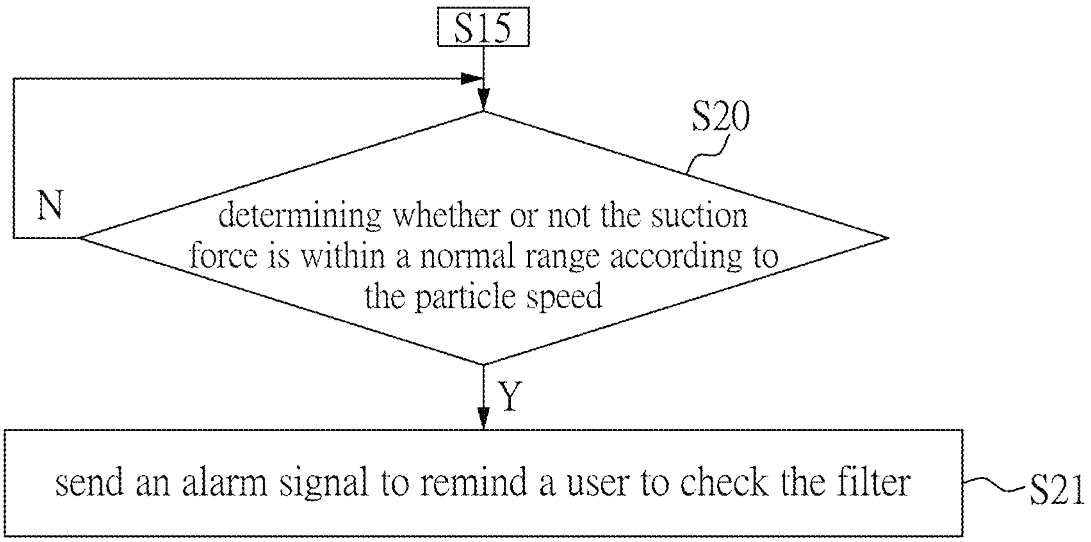
FIG. 6 is another flowchart of the cleaning method according to one embodiment of the present disclosure.

Reference can be further made to FIG. 6, which is another flowchart of the cleaning method according to one embodiment of the present disclosure.

As shown in FIG. 6, the cleaning method can further include configuring the processing unit 6 to, in response to the particle speed being obtained in step S15, perform the following steps:

Step S20: determining whether or not the suction force is within a normal range according to the particle speed.

In response to determining that the suction force is lower than the normal range, the cleaning method proceeds to step S21: send an alarm signal to remind a user to check the filter.

In response to determining that the suction force is not lower than the normal range, the cleaning method repeats step S20.

Specifically, when dusts on the filter 23 are accumulated to a certain extent, the suction force Fs is weakened. At this time, the displacement of the dust particles that pass through the air flow passage 21 become shorter, and thus the particle speed calculated from the displacement can be directly utilized to inference whether the suction force Fs is normal.

Therefore, when the suction force Fs is detected to be lower than a predetermined force value, the user can be notified by the mobile device 9 through the communication circuit 8, or can be notified by light or sound provided by an alarm device (e.g., a light source, a display and/or a speaker) provided on the main body 1.

In some embodiments, the memory 5 can be configured to store the above-mentioned cleaning strategy, an image recognition process, and a plurality of cleaning path corresponding a plurality of specific particle types, respectively.

Figure 7:
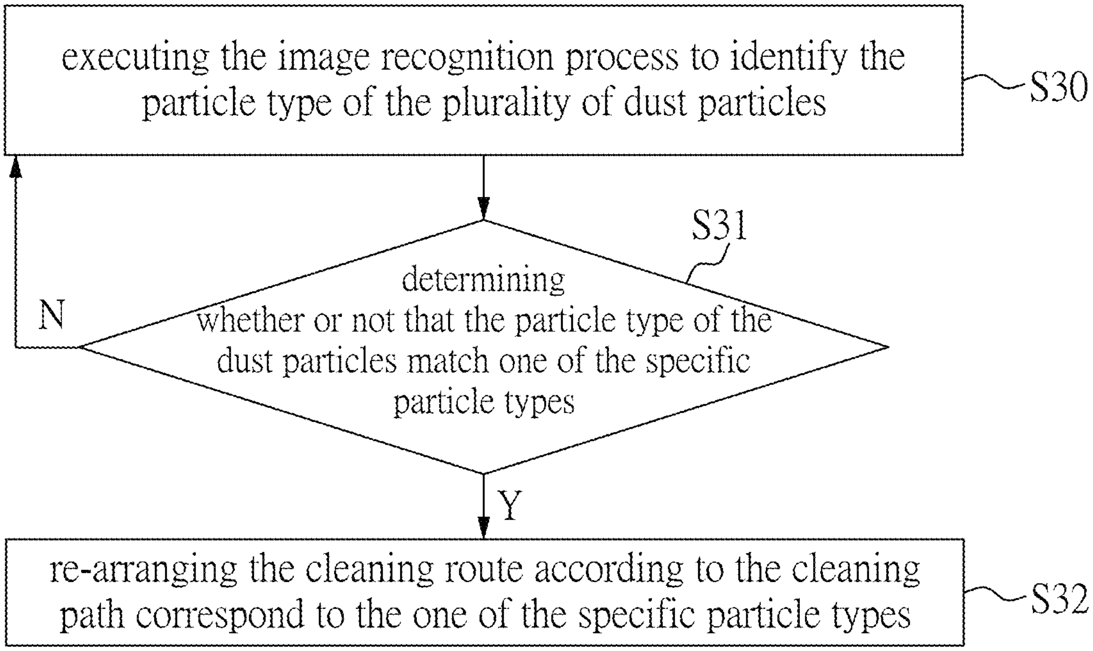
FIG. 7 is yet another flowchart of the cleaning method according to one embodiment of the present disclosure.

Reference is made to FIG. 7, which is yet another flowchart of the cleaning method according to one embodiment of the present disclosure.

As shown in FIG. 7, the cleaning method can further include configuring the processing unit 6 to perform the following steps:

Step S30: executing the image recognition process to identify the particle type of the plurality of dust particles.

Step S31: determining whether or not that the particle type of the dust particles match one of the specific particle types. Specifically, objects in the captured image frames can be identified through the image recognition algorithm, to be general dust, mold, broken glass, fluff, and the like.

In response to determining that the particle type of the dust particles match one of the specific particle types, the cleaning method proceeds to step S32: re-arranging the cleaning route according to the cleaning path correspond to the one of the specific particle types.

In response to determining that the particle type of the dust particles does not match any one of the specific particle types, the cleaning method proceeds back to step S30.

Figure 8:
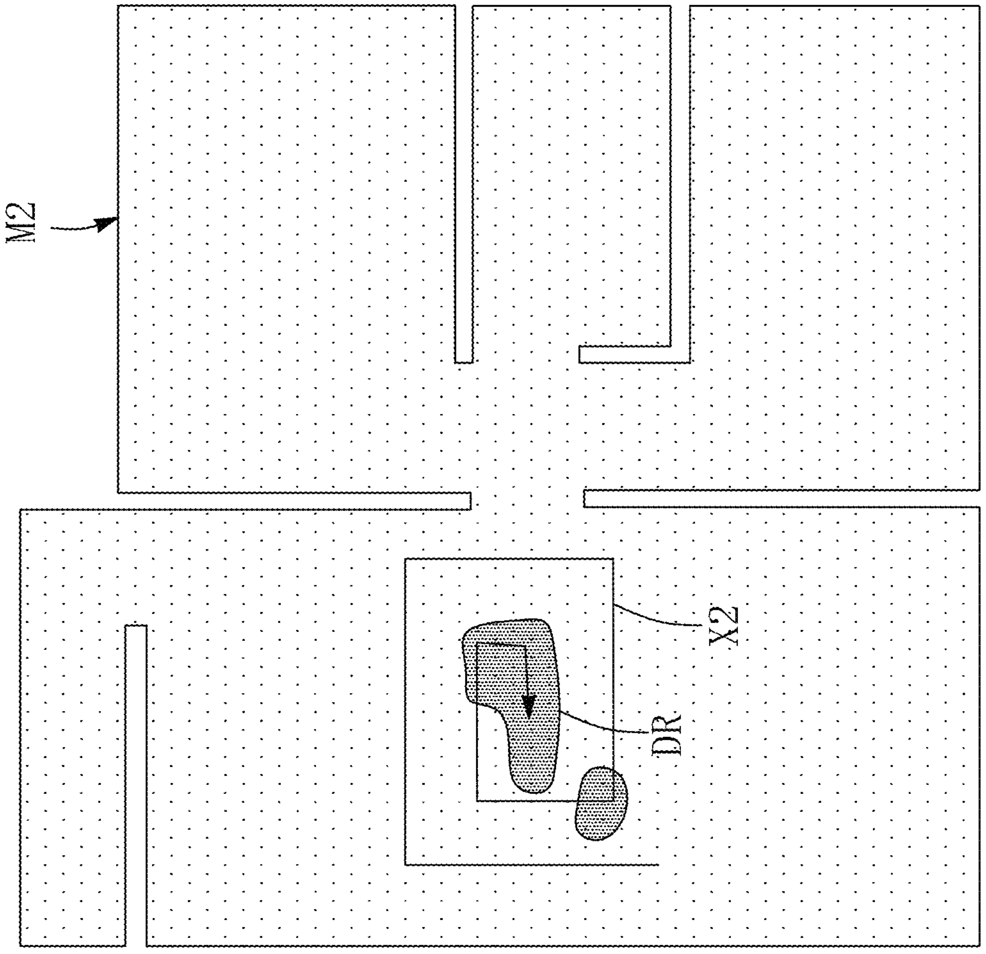
FIG. 8 is a schematic view showing another target map of the target region according to one embodiment of the present disclosure.

Reference is made to FIG. 8, which is a schematic view showing another target map of the target region according to one embodiment of the present disclosure. As shown in FIG. 8, when the autonomous robot sweeping through a region, a map of dust can be created and drawn on the target map M2, and can be displayed in layers. Therefore, the cleaning path can be adjusted in real time. For example, when the image recognition process is executed to identify that the dust particles in a dust region DR are milk powders, the processing unit 6 can immediately find the stored cleaning path corresponding to the milk powders, and re-arranged a new cleaning route X2, in which the path is planned to move from the outside of the dust region DR to the inside of the dust region DR, so as to avoiding the dust scattered and pushed to a wider range.

If there is too much powder/smoke inhaled in a specific area, such as overturned milk powder, the processing unit 6 can be configured to warn the user whether to clean or if there is an abnormal situation in the home, and record events occurred in the area, which may be meaningful information to the user.

Moreover, after cleaning, relevant environment information such as spatial temperature of the area, the distribution of dust density during the cleaning process, and the layer information of the area where the medium and large objects are inhaled, can be recorded for the user.

In certain embodiments, one or more sound sensor and ultrasonic sensor can be provided in the air flow passage 21 to detect a sound generated by a collision of dust and the inner surface of the air flow passage 21, and such sensors can be utilized in assisting the identification of the particle features.

Beneficial Effects of the Embodiments

In conclusion, in the cleaning system and the cleaning method provided by the present disclosure, particle features and corresponding cleanness condition can be obtained during a cleanness process by identifying dust particles from successive image frames, such that a cleanness strategy can be adjusted accordingly.

Furthermore, in the cleaning system and the cleaning method provided by the present disclosure, in response to dust enters a dust container through an air flow passage, particle size, passing speed and relevant information can be calculated by executing image processing algorithm, so as to determine whether or not a filter needs to be replaced due to excessive dust attachment. In addition, after cleaning processes are performed in a target region, a cleanness map can be created to provide cleanness information for the user to view.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cleaning method, comprising:

configuring a fan-motor assembly of an air suctioning device to generate a suction force to suction outside air through an air flow passage, wherein the air suctioning device is disposed in a main body, the fan-motor assembly is disposed in the air flow passage, and a driving system is disposed in the main body and includes a plurality of wheels and a motor;

configuring a light source to emit light to the air flow passage;

configuring an optical sensor to capture a plurality of successive image frames from the air flow passage;

configuring a processing unit electrically connected to the optical sensor, a memory and the driving system to:

obtain a first image frame and a second image frame from the plurality of successive image frames;

compare the first image frame with the second image frame to identify a plurality of dust particles;

obtain at least one particle feature of the plurality of dust particles, wherein the at least one particle feature includes a particle size, a particle quantity, a particle density, a particle type, and/or a particle speed;

determine a current cleanness condition according to at least one particle feature;

control the motor to drive the wheels to move or rotate the main body according to a cleaning strategy that defines a cleaning frequency and a cleaning route for a target region, wherein the memory is configured to store the cleaning strategy, an image recognition process, and a plurality of cleaning path corresponding a plurality of specific particle types, respectively;

adjust the cleaning strategy according to the current cleanness condition;

execute the image recognition process to identify the particle type of the plurality of dust particles;

determine whether or not the particle type of the dust particles match one of the specific particle types; and re-arrange the cleaning route according to the cleaning path corresponding to the one of the specific particle types.

2. The cleaning method according to claim 1, further comprising configuring the processing unit to determine whether or not to repeat the cleaning route or to adjust a moving speed of the main body according to the particle quantity and the particle density.

3. The cleaning method according to claim 1, wherein the air suctioning device further includes:

a filter disposed in the air flow passage for separating dust included in air that flows by an operation of the air suctioning device; and a dust container disposed to be in communication with the air flow passage for storing the dust separated by the filter.

4. The cleaning method according to claim 3, further comprising configuring the processing unit to determine whether or not the suction force is within a normal range according to the particle speed; and in response to determining that the suction force is lower than the normal range, configuring the processing unit to send an alarm signal to remind a user to check the filter.

5. The cleaning method according to claim 3, further comprising:

configuring a communication circuit disposed in the main body to communicatively connected to a mobile device of a user, wherein information associated with the cleanness condition and the cleaning strategy is transmitted between the processing unit and the mobile device through the communication circuit.

6. The cleaning method according to claim 5, further comprising configuring the processing unit to enable the mobile device to:

plot, according to the particle density and the current cleanness condition, a cleaning map on a target map of the target region on a user interface; and optimize the cleaning strategy according to the cleaning map.

* * * * *